(12) United States Patent
Matsumoto et al.

(10) Patent No.: US 7,088,120 B2
(45) Date of Patent: Aug. 8, 2006

(54) METHOD AND APPARATUS FOR MEASURING AND EVALUATING LOCAL ELECTRICAL CHARACTERISTICS OF A SAMPLE HAVING A NANO-SCALE STRUCTURE

(75) Inventors: Takuya Matsumoto, Kyoto (JP); Yoicho Otsuka, Ikeda (JP); Yasuhisa Naitoh, Tsukuba (JP); Tomoji Kawai, Mino (JP)

(73) Assignee: Osaka University, Suita (JP)

( * ) Notice: Subject to any disclaimer, the term of this patent is extended or adjusted under 35 U.S.C. 154(b) by 0 days.

(21) Appl. No.: 11/065,025

(22) Filed: Feb. 25, 2005

(65) Prior Publication Data

US 2005/0140387 A1 Jun. 30, 2005

Related U.S. Application Data

(63) Continuation of application No. PCT/JP03/03729, filed on Mar. 26, 2003.

(30) Foreign Application Priority Data

Aug. 26, 2002 (JP) ............................. 2002-245811

(51) Int. Cl.
G01R 31/02 (2006.01)
G01R 27/08 (2006.01)

(52) U.S. Cl. ....................................... 324/762; 324/715

(58) Field of Classification Search ..................... None
See application file for complete search history.

(56) References Cited

U.S. PATENT DOCUMENTS

| 5,047,633 | A | * | 9/1991 | Finlan et al. ............... 250/306 |
| 5,308,974 | A | * | 5/1994 | Elings et al. ............... 250/234 |
| 5,723,981 | A | * | 3/1998 | Hellemans et al. ......... 324/719 |
| 5,898,106 | A | * | 4/1999 | Babcock et al. ............. 73/105 |
| 6,094,971 | A | * | 8/2000 | Edwards et al. ............. 73/105 |

OTHER PUBLICATIONS

Yasuhisa Naito, et al., "Genshi Kanryoku Kenbikyo nl yoru Nano Scale Bunshi Kairo noDenki Dendodo Sokutei" (Measurements of the Electrical Conductivity of SWNT and DNA by AFM), 2002 Nen (Heisei 14 Nen) Shunki Dai 49 Kai Oyo Butsurigaku Kankei Rengo Koenkai Koen Yokoshu, separate vol. 3, The Japan Society of Applied Physics, Mar. 27, 2002, (29a-V-8, p. 1254.

(Continued)

*Primary Examiner*—Vinh Nguyen
*Assistant Examiner*—Russell M. Kobert
(74) *Attorney, Agent, or Firm*—Oblon, Spivak, McClelland, Maier & Neustadt, P.C.

(57) ABSTRACT

A probe device including a cantilever. A probe is attached to the cantilever and is allocated to be opposed to a surface of a sample attached thereto. An apparatus is provided with the probe device, which is capable of carrying out measurement of the sample while switching at a predetermined period two operating modes, a tapping mode for measuring a surface structure of the sample while vibrating the cantilever and a point contact mode for measuring an electrical characteristic of the sample while bringing the probe into contact with the sample.

10 Claims, 4 Drawing Sheets

OTHER PUBLICATIONS

Yoicho Otsuka, et al., "A Nano Tester: A New Technique for Nanoscale Electrical Characterization by Point-Contact Current-Imaging Atomic Force Microscopy", Japanese Journal of Applied Physics, Jul. 1, 2002, vol. 41, part 2, No. 7A, pp. L742-L744.

Yoicho Otsuka, et al., "Point-Contact Current-Imaging Atomic Force Microscopy: Measurement of Contact Resistance Between Single-Walled Carbon Nanotubes in a Bundle", Applied Physics Letters, Mar. 24, 2003, vol. 82, No. 12, pp. 1944-1946.

* cited by examiner

Tapping mode → Keeping feedback control → Point contact mode (1) Feedback control
(2) Excitation of cantilever
(3) Z-axis control
(4) Bias voltage Topography Current image

METHOD AND APPARATUS FOR MEASURING AND EVALUATING LOCAL ELECTRICAL CHARACTERISTICS OF A SAMPLE HAVING A NANO-SCALE STRUCTURE

CROSS-REFERENCE TO RELATED APPLICATIONS

This is a Continuation Application of PCT application Ser. No. PCT/JP03/03729, filed Mar. 26, 2003, which was published under PCT Article 21(2) in Japanese.

This application is based upon and claims the benefit of priority from prior Japanese Patent Application No. 2002-245811, filed Aug. 26, 2002, the entire contents of which are incorporated herein by reference.

BACKGROUND OF THE INVENTION

1. Field of the Invention

The present invention relates to a probe device and a method of controlling the device. More specifically, the present invention relates to a technique of carrying out: evaluation of local electrical conductivity of a nano-electric device surface; evaluation of an electrode of a nano-scale biological chip; research of a nano-region surface electrical conductivity; measurement of single molecule electrical conductivity; measurement of electrical conductivity of a single micro-crystal; evaluation of electrical conductivity of a domain critical interface; evaluation of electrical conductivity of a self-organized film; measurement of electrical conductivity of a single cell; and the like.

2. Description of the Related Art

Conventionally, evaluation of a local structure or electrical conductivity of a sample has been carried out by using a contact mode atomic force microscope which uses an electrically conducting probe (hereinafter, referred to as a "probe"). In this method, since the sample is scanned while the probe and the sample come into contact with each other, a certain degree of breakage occurs with both of the sample and probe. In a sample having a nano-scale structure, this breakage is fatal. Therefore, this contact mode measuring method cannot be applied to the sample having the nano-scale structure.

On the other hand, a tapping mode measurement is prevailingly known as a technique of evaluating only a structure. By means of this measuring method, measurement at a nano-scale resolution has been easily carried out. In this method, a cantilever is vibrated, thus making it possible to significantly reduce interaction between the probe and the sample, and further, measurement can be carried out without breaking the probe and the sample. In this method, however, a sufficient electrical contact cannot be obtained as compared with the contact mode measuring method. Therefore, this method cannot be used for evaluation of electrical conductivity in nano-scale.

Based on these restrictions, evaluation of local electrical conductivity in nano-scale is carried out as follows. First, structural measurement is carried out at a high resolution by using a tapping mode. Then, based on an image obtained by tapping mode measurement, the probe is moved to a predetermined position, the probe is pressed against the sample surface, and a current-voltage characteristic at the position is measured in a point contact condition. In this method, however, an intended position and a measuring point are shifted by a piezoelectric drift, thus making it impossible to precisely know a relationship between the structure and conductivity.

As has been described above, there has been no method for reliably measuring and evaluating local electrical conductivity of a sample having a nano-scale structure, and there has been a demand for an invention of a novel method.

BRIEF SUMMARY OF THE INVENTION

It is an object of the present invention to provide a technique for reliably measuring and evaluating local electrical conductivity of a sample having a nano-scale structure.

In the gist of the invention, advantages of currently widely prevailing tapping mode measurement and a current-voltage measurement in accordance with a point contact mode are combined with each other so as to induce a common advantage of these measurements. A specific description will be given below.

Tapping mode measurement and point contact measurement are alternately carried out in advance while these measurements are switched every predetermined time in pixels specified by software. In this manner, while the damage of the sample and probe is minimized and a high resolution is maintained, an electrical contact sufficient to measurement of electrical characteristics can be obtained. As described above, according to the present invention, a local electrical characteristic of such a surface including an insulator can be imaged at a nano-scale resolution. In addition, an effect of drift can be avoided, thus making it possible to investigate a correlation between a nano-structure and an electrical characteristic without any error. Such a function is effective for evaluation of electrical characteristics of a nano-scale electronic device such as a semiconductor integrated circuit, a biological sensor, or a molecular device.

As has been described above, in order to switch the tapping mode and the point contact mode within a predetermined time, in the invention, an excitation signal or a feedback system of cantilever vibration and a Z-piezoelectric position etc. are dynamically controlled in synchronism with probe scanning. According to the invention, a topography, a current distribution image at an arbitrary voltage, and a current-voltage curve in 16,000 or more locations can be acquired altogether in a short time, about 10 minutes.

BRIEF DESCRIPTION OF THE SEVERAL VIEWS OF THE DRAWING

FIGS. 2A and 2B are views each showing a measuring method according to an embodiment of the invention, wherein FIG. 2A is a view showing an appearance in the case where a tapping mode is switched to a point contact mode; and FIG. 2B is a chart showing a signal waveform in the case where the tapping mode (period I in the figure) and the point contact mode (period II in the figure) are alternately switched to each other every predetermined period, thereby carrying out measurement.

FIGS. 3A to 3D are views each showing a measurement result in the case where the present invention is applied, wherein FIG. 3A shows a topography obtained by tapping mode measurement; FIG. 3B shows a topography obtained by point-contact current-imaging atomic force microscopy; FIG. 3C shows a current image measured at the same time when the measurement of FIG. 3B is carried out; and FIG. 3D is a view showing a relationship between a current and a distance from an electrode on a carbon nanotube.

FIGS. 4A and 4B are views each showing another measurement result in the case where the present invention is applied, wherein FIG. 4A shows a topography, and FIG. 4B shows a current image measured at the same time when the measurement of FIG. 4A is carried out.

DETAILED DESCRIPTION OF THE INVENTION

Hereinafter, an embodiment of the present invention will be described with reference to the accompanying drawings.

Figure 1:
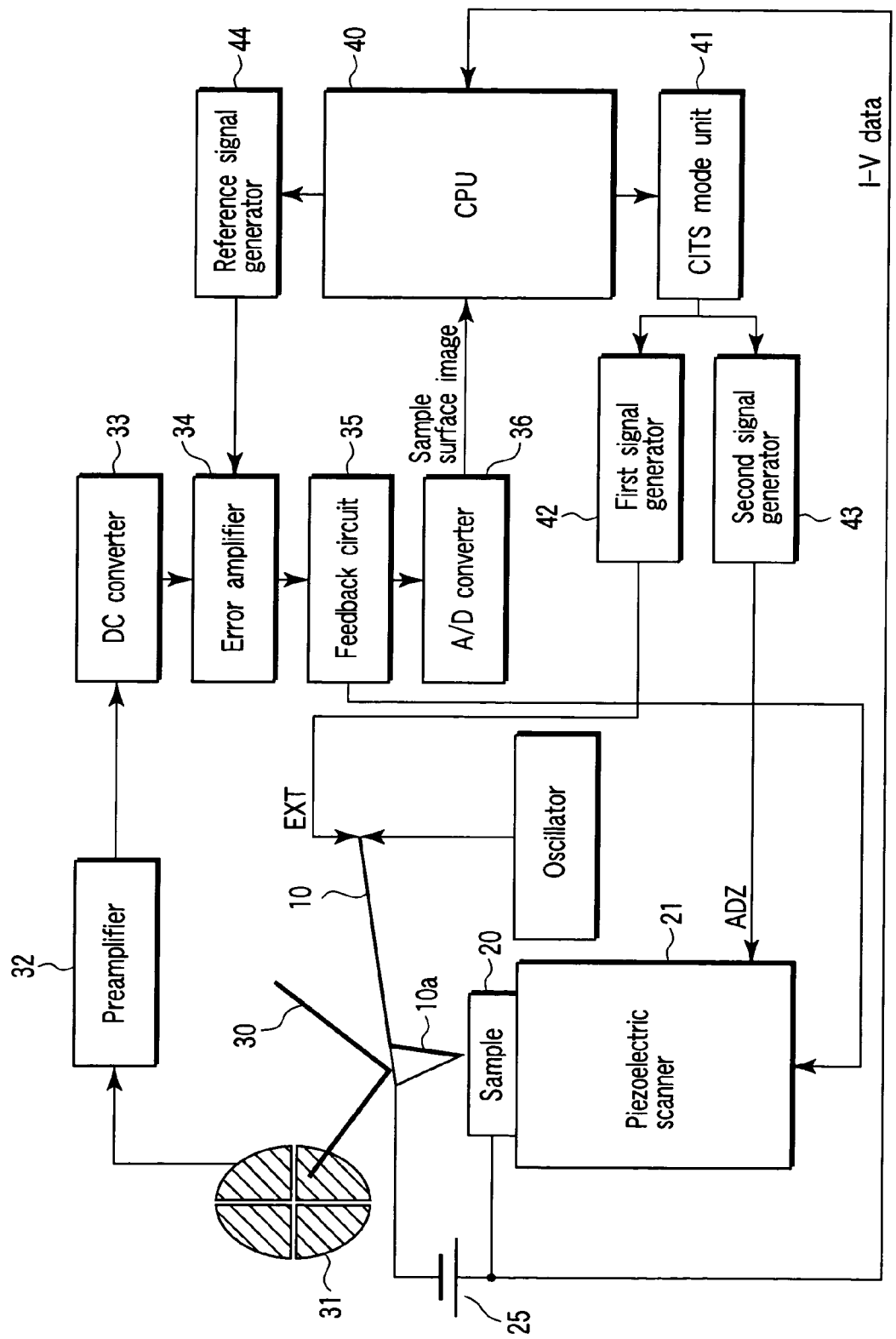
FIG. 1 is a diagram showing a general configuration of a probe device according to an embodiment of the present invention.

FIG. 1 is a diagram showing a general configuration of a probe device according to an embodiment of the present invention. In the following description, a probe device will be described by way of example of a generally used atomic force microscope.

As an atomic force microscope (AFM), there is utilized an AFM using an electrically conducting cantilever 10 having a probe 10a. As shown in FIG. 1, at a position opposed to the probe 10a, a sample 20 is allocated on a piezoelectric scanner 21 so as to be movable on three axes. In addition, a desired voltage can be applied between the sample 20 and the probe 10a by means of a bias 25 at which the applied voltage is variable.

The piezoelectric scanner 21 can move a sample along an X-Y plane by an X-Y scanning signal (not shown). In this manner, it becomes possible to measure a surface properties at a desired position. Further, the piezoelectric scanner 21 can be moved in a Z direction by inputting a Z signal from a feedback circuit 35 and a second signal generator 43 described later in detail.

Figure 2A:
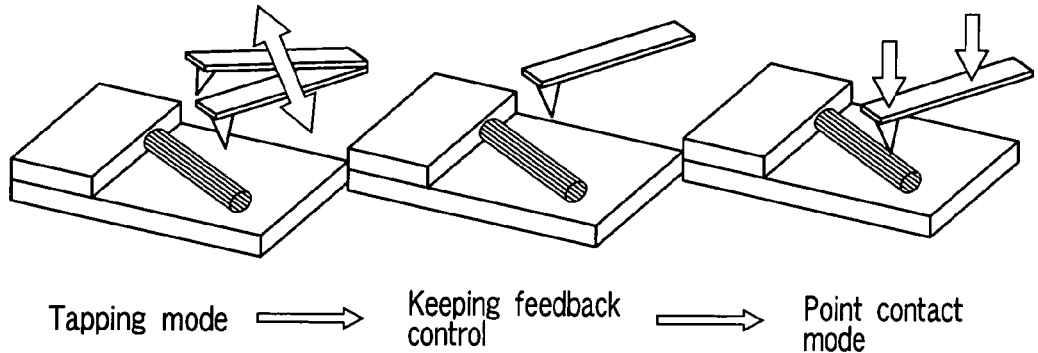
Figure 2B:
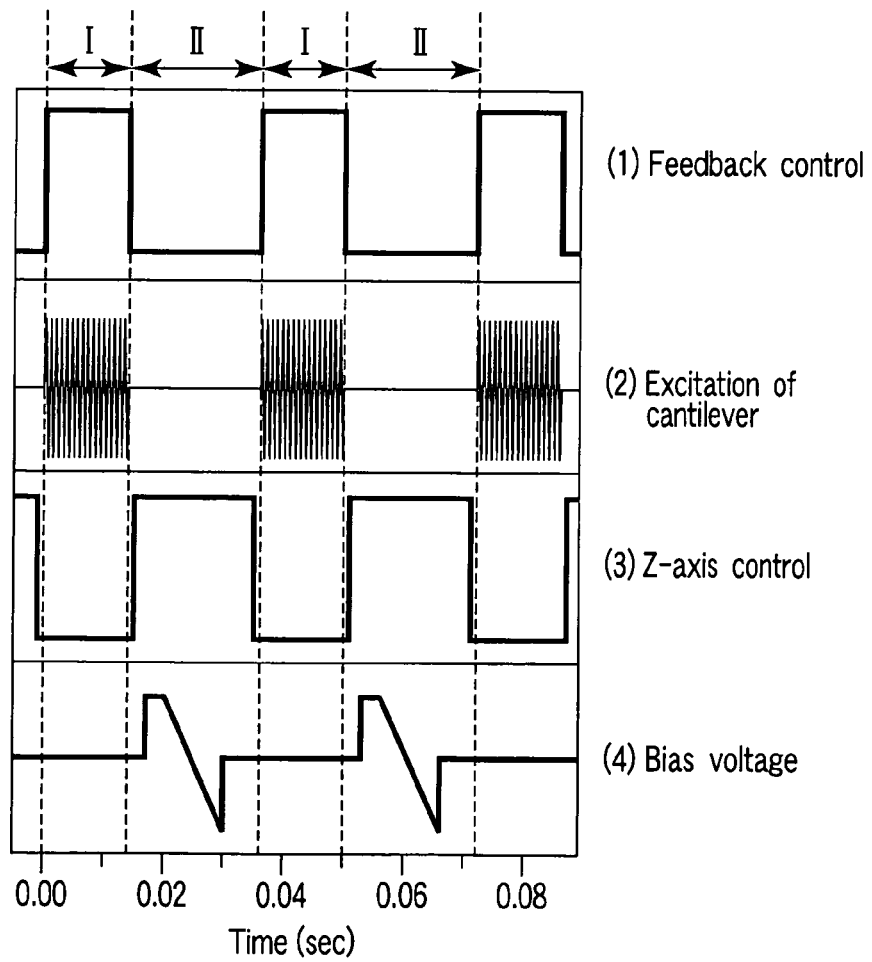

A specific observing method will be described with reference to FIGS. 2A and 2B. FIG. 2A is a view showing an appearance in the case where a tapping mode is switched to a point contact mode. FIG. 2B is a chart showing a signal waveform in the case where the tapping mode (period I in the figure) and the point contact mode (period II in the figure) are alternately switched to each other every predetermined period (for example, every 10 ms to 20 ms, i.e., period of 20 ms to 40 ms), thereby carrying out measurement. In the invention, as shown in FIGS. 2A and 2B, the tapping mode and the point contact mode are alternately switched to each other every predetermined time, thereby carrying out sample measurement. First, a control in the tapping mode will be described here. In the following description, it is assumed that the tapping mode is entered when a feedback control signal is "High", and the point contact mode is entered when the feedback control signal is "Low".

A CPU 40 supplies a command to a CITS mode unit 41 so as to operate in the tapping mode. The CITS mode unit 41 supplies a command to a first signal generator 42 and a second signal generator 43 so as to make an operation in the tapping mode. At this time, the CPU 40 makes a control so that a feedback control becomes "High". In this case, a superimpose signal and a bias voltage for feedback which controls the Z axis (distance between the probe and the sample) are set to zero.

The first signal generator 42 outputs an excitation signal for vibrating a cantilever 10 to a driver (for example, a piezoelectric element), although not shown, of the cantilever 10 during the tapping mode ((2) of FIG. 2B). In addition, at this time, the second signal generator 43 becomes "Low" ((3) of FIG. 2B). The vibration of the cantilever 10 is detected by a light source 30 and an optical detector 31, and the detection result is outputted to a preamplifier 32. A signal relating to the vibration of the cantilever 10 amplified by the preamplifier 32 is converted into a direct current signal by an RMS-DC converter 33. Then, the converted signal is compared with a reference signal by an error amplifier 34, and the related difference signal is outputted to a feedback circuit 35. An output from the feedback circuit 35 is inputted to the piezoelectric scanner 21 and an A/D converter 36. The A/D converter 36 converts the inputted signal into a digital signal, and outputs the converted digital signal as a sample surface image signal to the CPU 40.

Further, the CPU 40 supplies a command for generating a reference signal to a reference signal generator 44. In accordance with this command, the reference signal generator 44 outputs the reference signal to the error amplifier 34.

After elapse of a predetermined time, the vibration of the cantilever 10 is stopped (that is, the tapping mode is stopped) without changing the position of the sample, the cantilever 10 is pushed against the sample 20 (that is, the sample is protruded in predetermined amounting the Z-axis direction, and the cantilever is set in a predetermined load state), and the probe 10a and the sample 20 are brought into point contact with each other, thereby carrying out measurement in accordance with the point contact mode. At this time, an output from the first signal generator 42 is set to "0", and the cantilever 10 does not vibrate. When the tapping mode measurement is switched to the point contact measurement, it is preferable that the vibration of the cantilever 10 be stopped speedily. Thus, a signal in a reversed phase from an excitation signal of the cantilever 10 is supplied from the first signal generator 42, whereby the vibration of the cantilever 10 may be forcibly stopped. In addition, the second signal generator 43 outputs a DC signal so as to be superimposed on a feedback signal from the feedback circuit 35, thereby specifying a distance between the sample 20 and the probe 10a in this point contact mode. A relationship between the cantilever 10 and the sample 20 is set in such a state, a bias is swept between the probe 10a and the sample 20, and a current-voltage characteristic is measured. It is preferable that, when the tapping mode is switched to the point contact mode, a feedback loop is "frozen" and a value before freezing the feedback loop is stored, and that, when the point contact mode is switched to the tapping mode again, tapping mode measurement be restarted by using the stored value.

The above-described tapping mode measurement result and point contact mode measurement result are stored in a memory or a hard disk connected to the CPU 40 (or a recording medium such as an optical disk), although not shown. Then, these measurement results are outputted as a current image in a predetermined bias as required or in a real time, together with a topography. In this case, any recording medium may be used as long as it can store a measurement result without being limited to the memory or hard disk described above. In addition, the output of the results may be displayed on, for example, a display. Further, the output means includes printout to a printer or the like; writing on an external device; or transmission via a network.

Figure 3A:
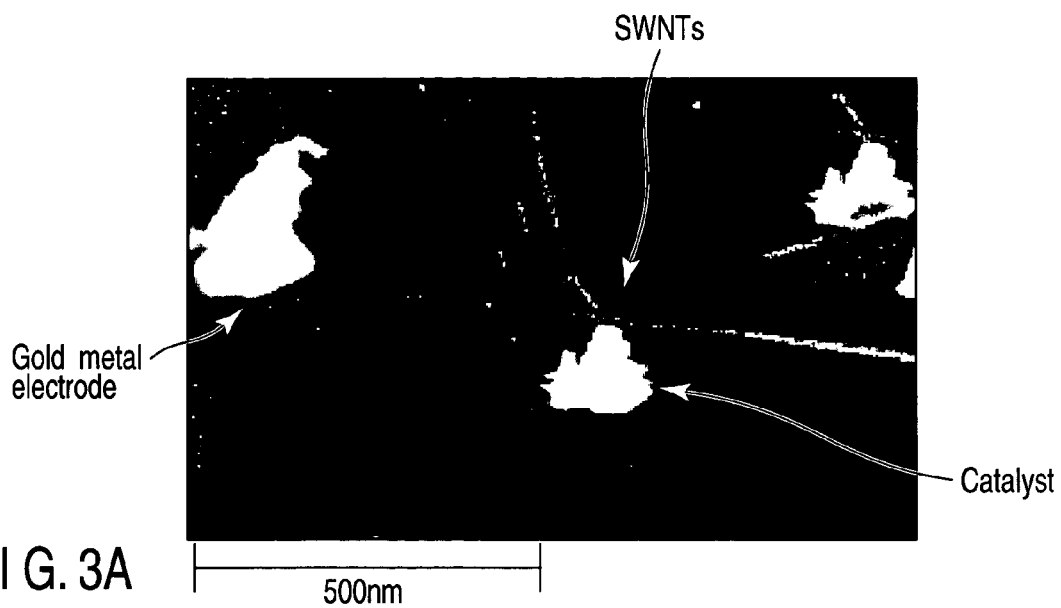
Figure 3B:
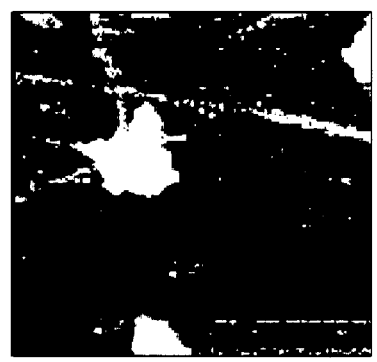
Figure 3C:

The measurement results obtained by applying the present invention will be shown in FIGS. 3A to 3D. FIGS. 3A to 3D are views each showing a measurement result obtained by applying the invention to a single-layered carbon nanotube dispersed on a mica and connected to a gold metal electrode. FIG. 3A shows an AFM image obtained by general tapping mode measurement indicating a sample state. It is found that the gold metal electrode exists on the left, and the single-layered carbon nanotube extends therefrom. The technique according to the invention is applied to the vicinity of the center of this image. FIGS. 3B and 3C are views showing the measurement results, the views showing a topography and a current image measured at the same time by switching a mode, respectively. As shown in FIG. 3C, it is found that the current image is obtained at a high resolution.

Figure 3D:
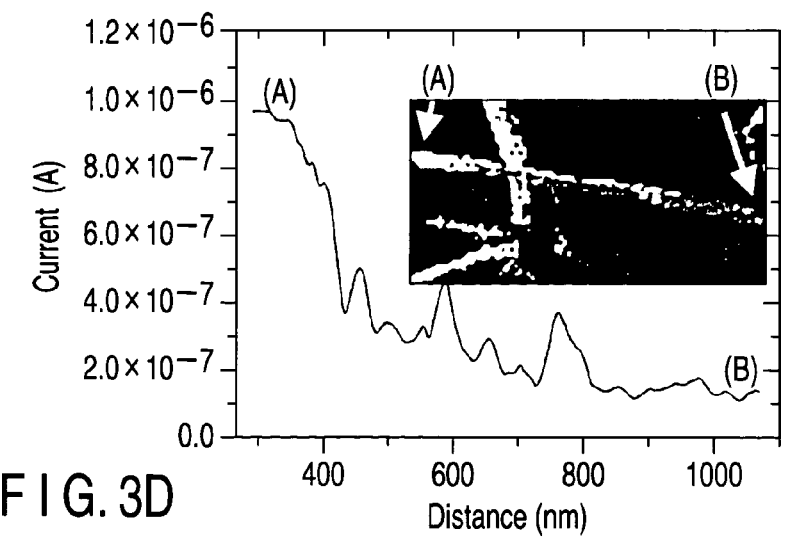

From the topography of FIG. 3B, it is found that a current is reduced as the current image of FIG. 3C goes to the right side, despite a nanotube contrast is substantially constant. In addition, a portion which is not electrically connected cannot be seen in the current image. FIG. 3D is a view showing a result obtained by plotting the current distribution on the nanotube at point (A) to point (B) along the nanotube. According to FIG. 3D, the current distribution is obtained as graphically depicted, and a decreased current value can be traced as a distance from the gold metal electrode becomes long.

As has been described above, according to the measurement examples of FIGS. 3A to 3D, it is found that electrical characteristics of a nano-scale circuit configured on an insulation substrate can be evaluated.

Figure 4A:
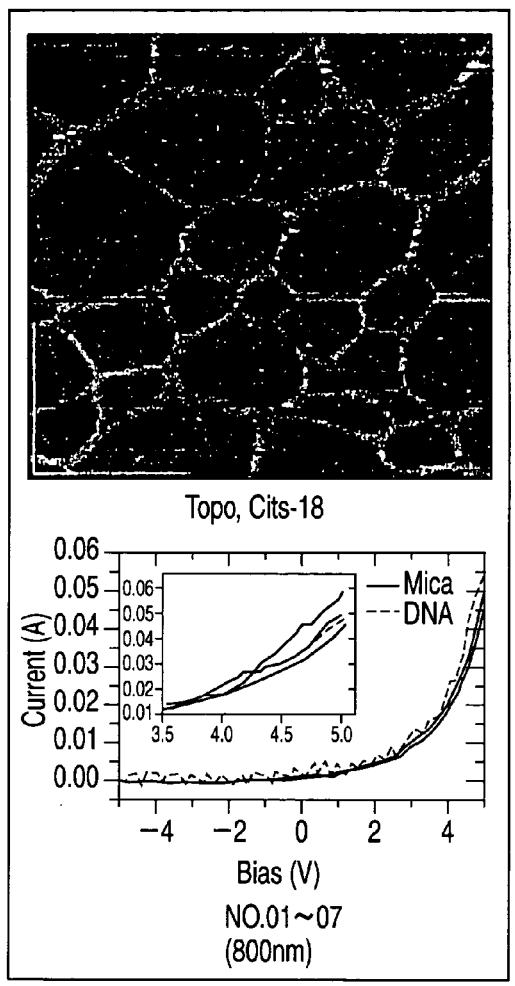
Figure 4B:
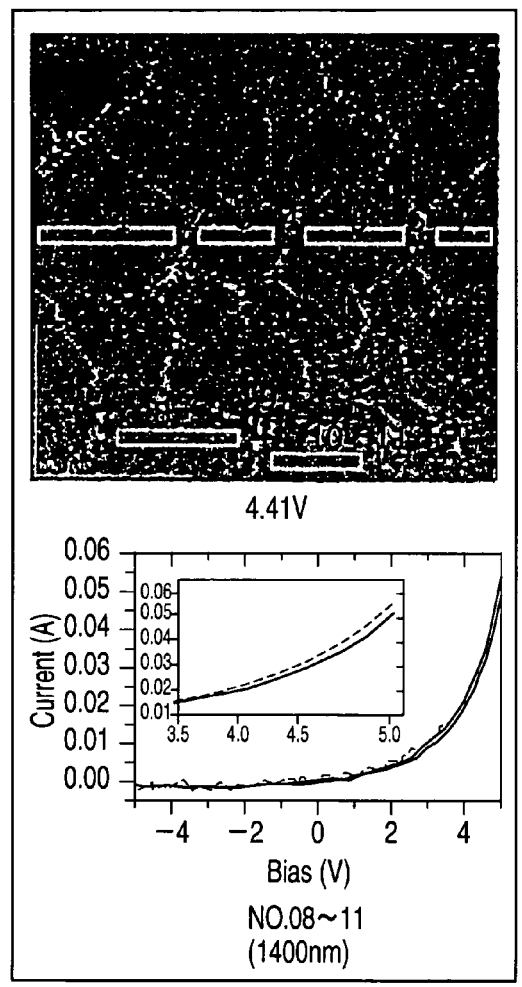

FIGS. 4A and 4B are views each showing a measurement result in the case where the technique according to the invention is applied to a DNA network in atmosphere having a humidity of 60%. This DNA network is formed on a mica, and one end of the network is connected to the gold metal electrode. A current image has been monitored at a portion along the DNA network. Since the image does not appear as long as a bias current is speedily swept, the current image is obtained as a displaced current which exists at the position of a DNA chain rather than a direct current-like current which flows the DNA chain. This current image is monitored only when a humidity is high, and thus, it can be estimated that an ion or an electrical double layer are associated with this displacement.

Therefore, according to the measurement examples of FIGS. 4A and 4B, it is possible to measure an electrical characteristic at a nano-scale resolution with respect to a system which includes an electrochemical phenomenon such as a biological chip.

The present invention is not limited to the above-described embodiment of the invention. Of course, various modifications can occur without departing from the spirit of the invention.

According to the invention, a current distribution image in an arbitrary bias can be obtained at a nano-scale resolution at the same time when a topography is obtained. In addition, a current-voltage characteristic at each point can be acquired by a single scan. Further, the invention can be applied even if an insulator exists partly of a sample.

What is claimed is:

1. A probe device comprising:
   a cantilever comprising a probe allocated to be opposed to a surface of a sample; and
   means for carrying out measurement of the sample while switching at a predetermined period two operating modes, a tapping mode for measuring a surface structure of the sample while vibrating the cantilever and a point contact mode for measuring an electrical characteristic of the sample while bringing the probe into contact with the sample.

2. The probe device according to claim 1, wherein, when the tapping mode is switched to the point contact mode, a signal in a reversed phase from an excitation signal is applied to the cantilever.

3. The probe device according to claim 1 or 2, wherein the predetermined period ranges from 10 ms to 20 ms.

4. The probe device according to claim 1 or 2, wherein, when the tapping mode is switched to the point contact mode, the sample is protruded in predetermined amounting a Z-axis direction, and the cantilever is set in a predetermined load state.

5. The probe device according to claim 1 or 2, wherein, when the tapping mode is switched to the point contact mode, a feedback loop is "frozen" and a value thereof is stored, and when the point contact mode is switched to the tapping mode, measurement in the tapping mode is restarted by using the stored value.

6. A method of controlling a cantilever comprising a probe allocated to be opposed to a surface of a sample, the method comprising:
   measuring the sample while switching at a predetermined period two operating modes, a tapping mode for measuring a surface structure of the sample while vibrating the cantilever and a point contact mode for measuring an electrical characteristic of the sample while bringing the probe into contact with the sample.

7. The method according to claim 6, further comprising: when the tapping mode is switched to the point contact mode, applying a signal in a reversed phase from an excitation signal to the cantilever.

8. The method according to claim 6 or 7, wherein the predetermined period ranges from 10 ms to 20 ms.

9. The method according to claim 6 or 7, wherein, when the tapping mode is switched to the point contact mode, the sample is protruded in predetermined amounting a Z-axis direction, and the cantilever is set in a predetermined load state.

10. The method according to claim 6 or 7, wherein, when the tapping mode is switched to the point contact mode, a feedback loop is "frozen" and a value thereof is stored, and when the point contact mode is switched to the tapping mode, measurement in the tapping mode is restarted by using the stored value.

* * * * *